United States Patent Office 3,117,172
Patented Jan. 7, 1964

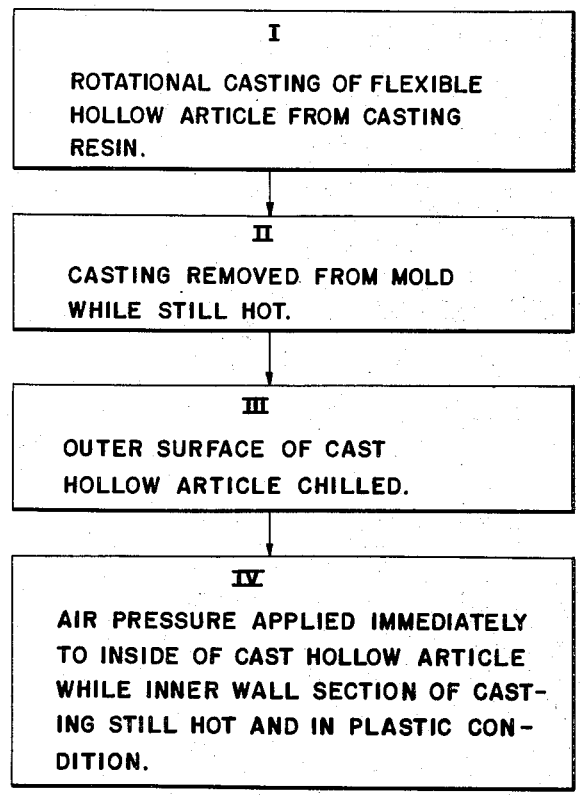

3,117,172
PROCESS OF INFLATING EXPANDIBLE
HOLLOW ARTICLE
George L. Hampton, Ravenna, Ohio, assignor to The
Oak Rubber Co., Ravenna, Ohio, a corporation of
Ohio
Filed Jan. 25, 1963, Ser. No. 253,860
9 Claims. (Cl. 264—96)

This invention is related to a process for inflating an inflatable and expandible hollow plastic article by the application of air pressure to the inside thereof. More particularly, this invention is related to a process of preconditioning such an expandible article so that the expansion is effected uniformly.

This application is a continuation-in-part of my application Serial No. 144,847, filed October 13, 1961.

In producing hollow articles such as basketballs, footballs, and other kinds of balls, by the casting of such articles from vinyl resins, such as polyvinyl chloride, etc., for example by the rotational hollow casting of such articles, the hollow article is generally inflated after the article is cast. Previous practice has been to allow the ball or other hollow article to cool completely to room temperature before air pressure was exerted to expand the ball to a desired diameter. Expansion was generally limited to between 5 percent and 10 percent of the uninflated diameter since expansion to a greater degree resulted in out-of-round articles that would not bounce straight.

The reason for this limitation on expansion is that such castings rarely have uniform wall thickness, so that there is generally a thinner wall section which undergoes greater expansion. This results in a bulge in the shape of the article and in some cases can result in a rupture of the article. Non-uniformity in the shape of the article results in reduced saleability, particularly with spherical balls since lopsidedness or a bulge in the ball interferes with straight bouncing of the ball.

Obviously, if expansion much greater than the 5 percent to 10 percent limitation could be achieved, considerable savings could be effected. For example, with limited expansion, it requires a mold 5 inches in diameter to make a ball that would be 5½ inches in diameter after inflation. With a 30 inch diameter mold plate, only 18 molds can be practically mounted to make a 5½ inch ball. However, if expansion from 3 inches to 5½ inches can be accomplished as many as 30 molds of a 3 inch size can be mounted, thus reducing molding costs substantially and increasing the production rate very appreciably.

Therefore, it has been found advantageous to expand the hollow article while the hollow-cast article is still at a temperature considerably above room temperature. This permits taking advantage of the more plastic condition and easier expandibility of the polyvinyl chloride or other resin with the attendant advantages. For example, while polyvinyl chloride is cured after fusion at 375°–400° F., it remains plastic and in a formable state until it is cooled to approximately 170° F. Here again, it has been found that the thin wall sections mentioned above result in an expansion that is not uniform and the resultant article is lopsided, or has bulges, or again in some cases, the pressure may cause the ball to become ruptured.

In accordance with the present invention, it has now been found that it is possible to take better advantage during expansion of the more plastic condition of the cast resin by maintaining the interior of the cast article at a temperature above 190° F., preferably at least 200° F., giving the exterior surface a preliminary chilling so that a thin layer of cooled resin gives greater strength to the exterior and still allows a substantial amount of the resin on the inside to remain in a more plastic condition during expansion or inflation of the article. The inflation serves to distribute the still plastic material on the inner side to a more uniform thickness and thereby corrects any non-uniformity of wall thickness which occurred in the original casting of the article. It has been found that polyvinyl chloride balls can be more advantageously expanded to double and even triple their original diameters by the application of compressed air to the inside thereof by having the exterior surface chilled to approximately room temperature while the interior remains at a temperature above 190° F., preferably at approximately 200° F.

This chilling is advantageously effected by conducting the balls through a spraying zone wherein water at a controlled temperature is sprayed onto the outer surface of the ball until this temperature is reached. The spray period should be only for the period required to bring the outer surface to approximately room temperature and should not be prolonged beyond this point since the cooling will then be effected beyond the desired depth in the wall thickness of the article. Likewise, too short a spray period will result in insufficient cooling and hardening of the exterior surface.

It has been found that when such an article is sprayed with water at a temperature of 55°–65° F. it is suitably cooled after a period of about 25–45 seconds depending upon the mass of the article. However, other water temperatures and spraying periods which will give the equivalent type of cooling can be used.

While the desired temperature of the outer skin of the cast is at room temperature upon removal from the water spray, it will grow warmer if allowed to stand, due to the hot interior skin. For best results, inflation must be effected promptly. The conditions for obtaining this temperature without adversely lowering the temperature of the resins through the entire thickness, will vary somewhat according to the thickness of the casting, as well as any variation in the softening properties of the particular resin from which the hollow article is cast. Preferably with polyvinyl chloride, the wall thickness is in the range of ⅛ inch to ¼ inch.

The above conditions have been found particularly suitable for a polyvinyl chloride ball of 3 inches diameter rotationally cast from polyvinyl chloride with subsequent expansion to diameters of 5 inches to 7 inches. Likewise, for 4 inch balls with subsequent expansion to 6.5 to 8.5 inches, and for 5 inch balls to 9.5 to 11 inch expansion.

The accompanying drawing is a flow sheet of the process of this invention. Step I: Comprises the rotational casting of a hollow article from a casting resin in accordance with techniques well-known in the prior art. Step II: The hollow casting is removed from the mold while still hot. Step III: The outer surface of the hollow cast article is chilled. Step IV: As described herein, the air pressure is applied inside the hollow article immediately after the chilling of the outer surface and while the inner wall section is still hot and plastic.

In actual operation, it is found preferable that the cast articles should be removed from the molds as hot as possible without deformation, advantageously with a temperature of about 150°–170° F. at the outer surface. It is advantageous to place the articles immediately in an oven which will maintain the resin at the desired temperature until the articles are to be processed for inflation. It has been found advantageous to maintain these articles at a temperature in the range of 190° F. to 225° F., preferably at about 200° F. Although other arrangements are obvious, a particularly suitable one has been found to be a continuous conveyor running inside a long rectangular oven maintained at the desired temperature. With the conveyor moving at the rate of about approximately 9 inches per second (or about 45 feet per minute), the articles will then be presented at a rate at which an operator can process the articles and maintain proper temperature conditions.

After the article has passed through the temperature-maintaining oven, it is removed from the conveyor by an operator, or by automatic equipment, and placed in a device which will effect the desired degree of surface cooling under a water spray. An advantageous arrangement is to have the article placed on an inclined track which passes under a water spray.

In inflating the articles, an air pressure is used which accommodates an efficient speed for the inflation operation. Pressures of 100–120 p.s.i. have been found suitable with a pressure of about 110 p.s.i. being preferred.

In a typical operation, cited merely for illustrative purposes, polyvinyl chloride spherical balls with a diameter of 4 inches and a wall thickness of about 3/16 inch are cast by a rotational casting method commonly used in present commercial practice whereby the polyvinyl chloride is cured at a temperature of 375°–400° F. The balls are removed from the casting molds and placed directly on a conveyor passing through an oven maintained at a temperature of approximately 200° F., the conveyor moving at a rate of approximately 9 inches per second. When the operator is ready to process the balls for inflation, they are removed from the conveyor and placed on an inclined track which carries the articles under a spray of water at approximately 60° F. for a period of approximately 35 seconds. The operator removes the balls from the bottom of the inclined track and using standard inflating equipment for such purposes, inflates the ball with compressed air at about 110 p.s.i. to a diameter of about 7.5 inches. The resultant ball is of uniform diameter and true spherical shape.

While the above method of practicing the invention is preferred and gives the most effective results, it is also possible and within the scope of this invention to allow the molded balls to cool to room temperature and after a period as long as two or three weeks or even longer, to reheat the balls to a temperature in the range of 190°–225° F., preferably about 200° F., and then to perform the chilling operation as previously described. While the results are not as excellent as those obtained by the preferred method, this latter procedure produces results much superior to those obtained when the balls are expanded while the balls are at the high temperature and without the chilling operation, and also much superior to the results obtained if the balls are expanded without the reheating and chilling as described. This procedure permits the storage of balls for subsequent inflation when the rate of molding or producing the balls exceeds the rate at which the chilling and inflation operation can be conducted.

This latter procedure is believed ot be effective due to the fact that, in spite of a certain amount of thermo-setting of the resin material, the higher temperature at which the inner portion of the ball is subjected gives an increased amount of plasticity as compared to room temperature. Consequently, the chilling of the outer portion has a similar control in effecting uniform expansion and more true spherical shape in the resultant product.

This invention makes it possible to produce balls of large diameter using less material than was previously possible. It has not been possible previously to rotocast a ball with as thin a wall as is ultimately obtained by the practice of this invention. Therefore, in addition to the various other advantages recited above, this invention also permits a saving in the cost of plastic material used in the manufacture of balls.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. An improved process for the inflation of an expandible hollow article cast from a curable resin, comprising the steps of rotationally casting a hollow article from said resin, removing said article from the casting mold while still hot, maintaining the resin in the interior wall section of said article in a plastic condition while cooling the exterior surface of said article to a temperature range wherein the tensile strength of the resin in said exterior surface is sufficiently improved to permit expansion of the article in a uniform manner, and immediately thereafter applying air pressure to the interior of said article while the resin of said interior wall section is still in a plastic condition, said air pressure being applied in sufficient amount to expand said article to a diameter no greater than thrice the original diameter.

2. A process of claim 1 in which said article is formed of polyvinyl chloride, said exterior surface is cooled to approximately room temperature, and said article is expanded by said immediate application of air pressure to a diameter no greater than thrice the original diameter while said interior section is still at a temperature in the range of about 190°–225° F.

3. A process of claim 2 in which said interior section is maintained at a temperature of at least about 200° F.

4. A process of claim 3 in which said exterior cooling is effected by a water spraying operation equivalent to spraying with water at a temperature of about 55°–65° F. for a period of about 25–45 seconds.

5. An improved process for the inflation of an expandible hollow article cast from a curable resin, comprising the steps of rotationally casting a hollow article from said resin, removing said article from the casting mold, thereafter maintaining the resin in the interior wall section of said article at a temperature to give a plastic condition thereto while cooling the exterior surface of said article to a temperature range wherein the tensile strength of the resin in said exterior surface is sufficiently improved to permit expansion of the article in a uniform manner, and immediately thereafter applying air pressure to the interior of said article while the resin of said interior wall section is still in a plastic condition, said air pressure being applied in sufficient amount to expand said article to a diameter no greater than thrice the original diameter.

6. The process of claim 5 in which said article is removed from the casting mold, cooled to room temperature and thereafter reheated and maintained at a temperature which effects a plastic condition in the interior wall section of said article.

7. A process of claim 6 in which said article is formed of polyvinyl chloride, said article is reheated to a temperature in the range of about 190°–225° F., said exterior surface is cooled to approximately room temperature, and said article is expanded by said immediate application of air pressure to a diameter no greater than thrice the original diameter while said interior section is still at a temperature in the range of about 190°–225° F.

8. A process of claim 7 in which said interior section is maintained at a temperature of at least about 200° F.

9. A process of claim 8 in which said exterior cooling is effected by a water spraying operation equivalent to spraying with water at a temperature of about 55°–65° F. for a period of about 25–45 seconds.

No references cited.